UNITED STATES PATENT OFFICE.

AUSTIN H. CLAESSEN, OF IPOH, PERAK, FEDERATED MALAY STATES.

PROCESS FOR THE UTILIZATION OF BARK-SHAVINGS FROM RUBBER-TREES.

1,357,845.

Specification of Letters Patent. Patented Nov. 2, 1920.

No Drawing. Application filed March 4, 1920. Serial No. 363,291.

*To all whom it may concern:*

Be it known that I, AUSTIN HORACE CLAESSEN, a subject of the King of Great Britain, residing at Ipoh, State of Perak, Federated Malay States, have invented a new and useful Improved Process for the Utilization of Bark-Shavings from Rubber-Trees, of which the following is a specification.

This invention relates to a method or process for the extraction of rubber from bark shavings of rubber trees and for the utilization of such shavings which have hitherto (except for a small percentage of crepe rubber obtained therefrom) been a waste product. By my method or process I obtain a better yield of rubber from bark shavings and I produce a valuable product suitable for the manufacture of millboard, paper, roofing material, tapping cups, coagulating dishes, floor matting and a variety of other articles.

Heretofore the method for extracting rubber from bark shavings is one in which the bark shavings are passed through a machine known as a scrap-washer and then through a creping machine, the resulting rubber being sold as bark crepe.

According to the present invention, the bark shavings (mainly consisting of latex cells) are thoroughly ground and masticated between heated rollers at a temperature of about 275 degrees Fahrenheit, so as to knead the rubber thoroughly with the latex cells and other analogous matter in a heated condition and thus convert the entire mass into a dough-like or plastic substance.

This dough-like or plastic substance may be advantageously used for the manufacture of various articles as above indicated. For this purpose it is mixed with any suitable vulcanizing agent and is then shaped or molded into any of the articles above referred to, and then vulcanized. In some cases the mixing with a vulcanizing agent may precede the mastication by heated rollers.

This dough-like substance may advantageously form an "accelerator" in vulcanization and also serve as a filler in the manufacture of rubber goods.

Furthermore, instead of vulcanizing the dough-like or plastic substance as above mentioned, it may be treated for the extraction of pure rubber, for which purpose it is passed through a scrap washer and then through a creping machine in the known manner. By this means a larger yield of pure rubber is obtained than is possible by the processes above mentioned for treating bark shavings.

What I claim is:—

1. A method or process of treating bark shavings from rubber trees, wherein the bark shavings are ground and macerated between heated rollers so as to knead the rubber with the barky material and convert the whole into a dough-like or plastic material.

2. A process of treating bark shavings from rubber trees, wherein the bark shavings are ground and macerated between heated rollers so as to knead the rubber with the barky material and convert the whole into a plastic material, and such plastic material is passed through a scrap-washer and then through a creping machine, for the extraction of rubber therefrom.

3. A process of treating the bark shavings from rubber trees, consisting in grinding and masticating them under heat so as to produce a plastic substance, mixing therewith a vulcanizing agent, shaping the mixture, and vulcanizing the product.

4. A method or process of treating bark shavings from rubber trees consisting in grinding and masticating the bark shavings between heated rollers so as to knead the rubber with the barky material, and convert the whole into a doughlike or plastic material, mixing with this plastic material a vulcanizing agent and other rubber, and then vulcanizing the resultant mixture.

A. H. CLAESSEN.

Witnesses:
 AVON KOON LEONG,
 GEORGE L. LOGAN.